United States Patent [19]
Kincaid

[11] 4,243,394
[45] Jan. 6, 1981

[54] PIE SEGMENT SHAPED FLAMMABLE ARTIFICIAL FIRELOG

[75] Inventor: Thomas R. Kincaid, Sacramento, Calif.

[73] Assignee: DG Shelter Products Company, Sacramento, Calif.

[21] Appl. No.: 12,210

[22] Filed: Feb. 14, 1979

[51] Int. Cl.³ ............................................. C10K 5/36
[52] U.S. Cl. ........................................... 44/14; 44/40
[58] Field of Search ................ 44/14, 38, 40, 41, 10 R

[56] References Cited

U.S. PATENT DOCUMENTS

| | | | |
|---|---|---|---|
| 93,775 | 8/1869 | Webber | 44/40 |
| 3,726,651 | 4/1973 | Ronden | 44/14 |
| 3,877,886 | 4/1975 | Dalzell | 44/40 |
| 3,947,255 | 3/1976 | Hartman et al. | 44/10 H |
| 4,040,796 | 8/1977 | Vincent et al. | 44/14 |

Primary Examiner—Carl F. Dees
Attorney, Agent, or Firm—Flehr, Hohbach, Test, Albritton & Herbert

[57] ABSTRACT

An artificial composite flammable firelog of generally pie segment shaped transverse cross section configuration including perpendicular flat sides interconnected by a convex third side. The log is preferably formed of a wax and wood particle composite. It may include fire retardant on the flat sides for selective burning on the curved side which faces the fireplace opening. At least two of such firelogs may be extruded simultaneously by use of a unique die member. Four such firelogs are conveniently packed in a rectangular box.

7 Claims, 5 Drawing Figures

U.S. Patent    Jan. 6, 1981     Sheet 1 of 2     4,243,394
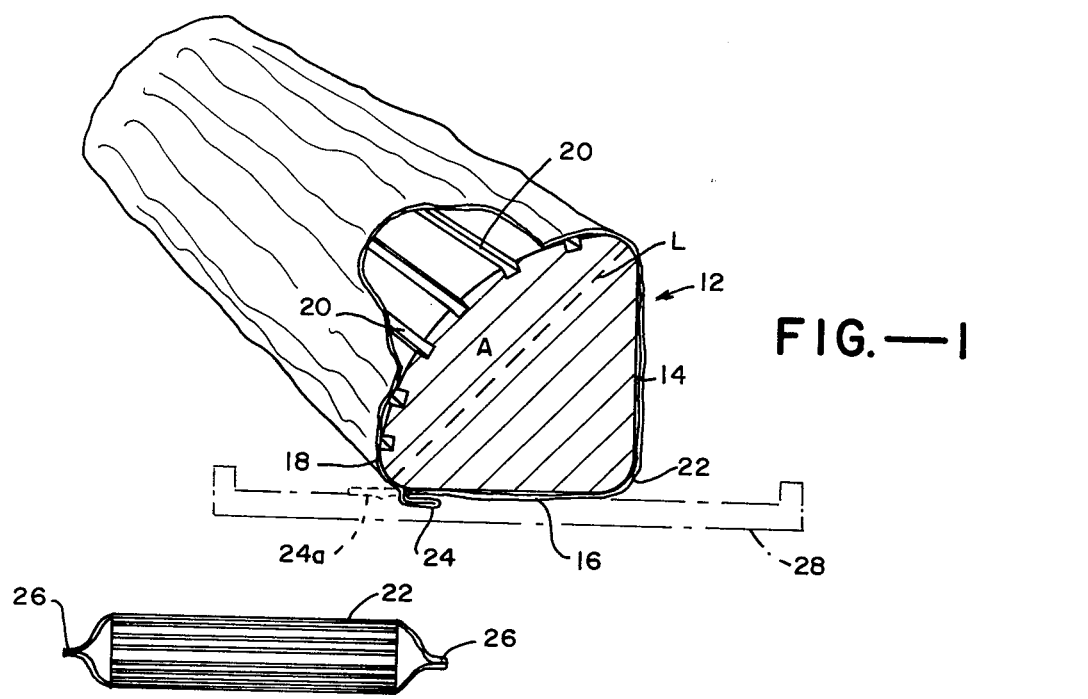
FIG.—1
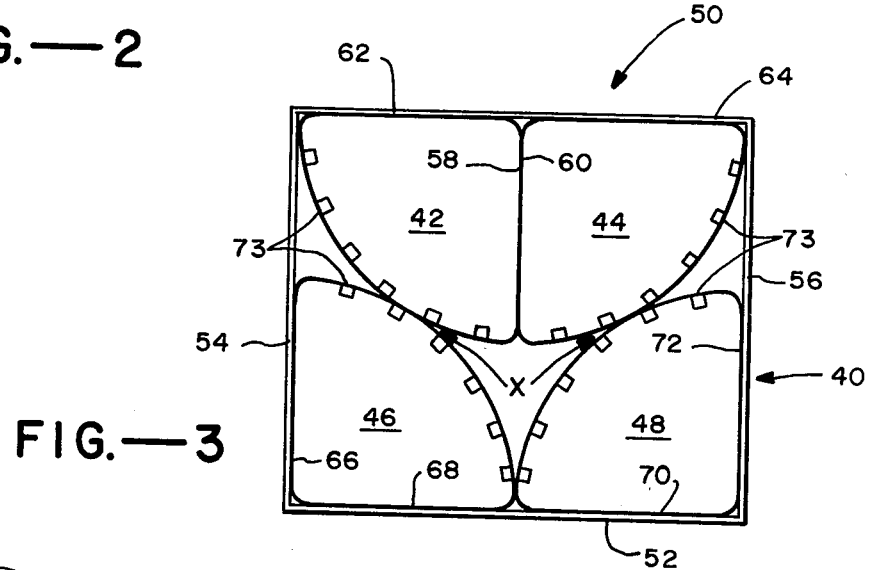
FIG.—2
FIG.—3
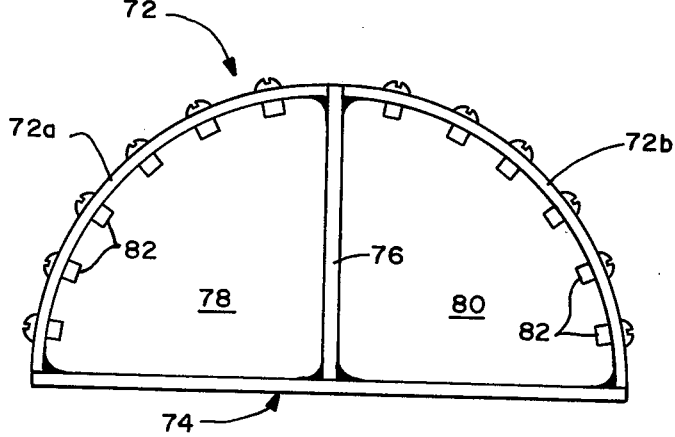
FIG.—4

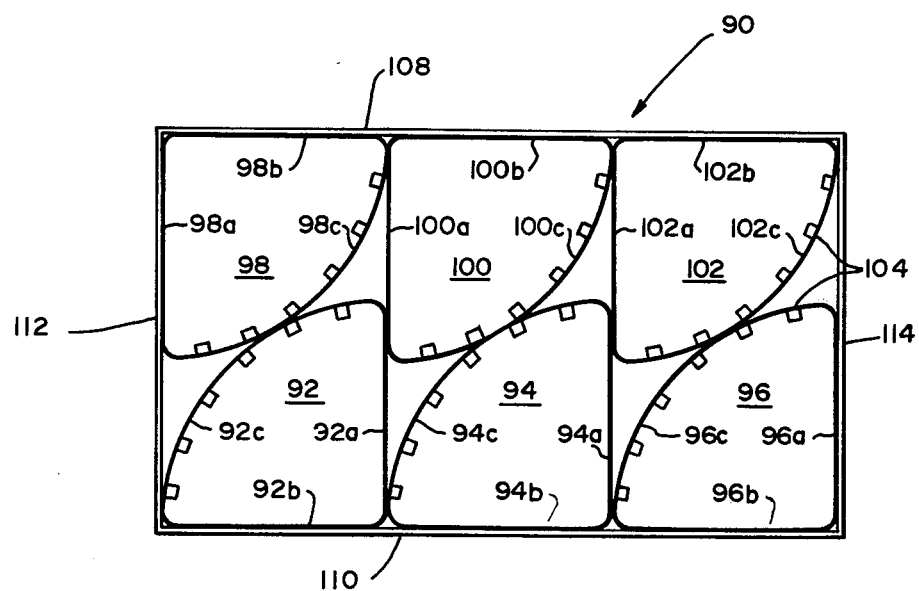
FIG.—5

PIE SEGMENT SHAPED FLAMMABLE ARTIFICIAL FIRELOG

BACKGROUND OF THE INVENTION

Flammable artificial firelogs have been formed from a variety of particulate wood and wax mixtures. Such logs are generally of a cylindrical cross section. Other tyes of artificial firelogs are known, for example, ones which include charcoal as the predominant portion. In U.S. Pat. No. 3,726,651, such logs are illustrated with ridges extended along the length of a cylindrical log with a central bore. There is an incidental disclosure at col. 4, lines 58–66 that logs of rectangular or triangular transverse cross section could be formed. However, there is no specific disclosure of any advantage of such shapes.

SUMMARY OF THE INVENTION AND OBJECTS

In accordance with the present invention, an artificial composite flammable firelog of generally pie segment shaped transverse cross section is formed with a convex curved side including multiple spaced parallel grooves. The log is particularly adapted for disposition on the grate of a fireplace with the curved section facing the fireplace opening. Such firelogs are readily packed into structurally strong stacks in packages with four firelogs to a package.

It is an object of the invention to form a pie segment shaped composite flammable firelog. It is a particular object of the invention to form a firelog of the foregoing type with excellent burn characteristics.

It is another object of the invention to provide unique packaging for the foregoing firelogs.

Further objects and features of the invention will be apparent from the following description taken in conjuncton with the appended drawings.

BRIEF DESCRIPTION OF THE DRAWINGS

FIG. 1 is an end perspective view of the log of the present invention, also illustrating a paper wrapper.

FIG. 2 is a side elevational view partially in section of the wrapped log of FIG. 1.

FIG. 3 is a package of four logs of the type of FIG. 1.

FIG. 4 is an end view of a die suitable for simultaneous extrusion of two of applicant's pie segment shaped firelogs.

FIG. 5 is a package of six logs of the type of FIG. 1.

DETAILED DESCRIPTION OF THE PREFERRED EMBODIMENTS

Referring to FIG. 1, an artificial composite flammable firelog generally designated by the number 12 is illustrated in accordance with the present invention. The log is of transverse cross section with intersecting generally flat elongate sides 14 and 16 intersecting with a third elongate curved side 18 of predominantly convex configuration. As illustrated, the firelog rests on flat side 16 which is perpendicular to vertical side 14. The intersections among the sides 14, 16 and 18 are rounded to provide more structural integrity to the logs. Curved side 18 includes a plurality of equally spaced grooves 20 extending along the length of the log. Suitably, six such grooves of rectangular shape (0.25 by 0.25 inch) are spaced about 0.5 inch apart.

Referring again to FIGS. 1 and 2, log 12 is illustrated wrapped in an external sheath 22 which may be formed of a conventional wrapper for an artificial firelog. Sheath 22 is sealed with an overlapping fin seal edge extension 24 formed by adhering the two mating circumferential ends of the sheath preferably at the intersection of the curved side with one of the flat sides. As illustrated in FIG. 1, edge 24 is flush against log 12 during shipment. When it is desired to light the log, edge 24 may be folded out away from the log, say by rotation 180° from the position in FIG. 1, as illustrated by the dotted line 24a, to provide a free leading edge which may be ignited to facilitate burning.

Referring to FIG. 2, sheath 22 also includes end seals 26 at opposite ends of the log formed by sealing the extended edges of the sheath to each other as with adhesive. End seals 26 also provide convenient lighting points for sheath 22 for ready ignition of the firelog.

Referring to FIG. 1, log 12 is illustrated resting on a firelog grate illustrated in phantom by the number 28. As will be described in more detail below, curved surface 18 is disposed on the grate to face the fireplace opening.

One major advantage of the present fireplace log is its aesthetic appeal. Thus, only the curved portion of the log, which is the primary burning surface, is visible to the observer of the log. The bulk of the flame travels along this curved surface for the reasons below so that there is only minimal burning on the backside of the firelog away from the observer.

Another important advantage of the present configuration is the ready ignition and burn of the log. It is well known that a flame will travel up such a curved surface far more rapidly then it will, say, on a flat inclined surface.

The exact curvature of curved side 18 is not critical to the invention. However, it is preferred that such side provide a substantially continuous curve for optimum flame characteristics and may be formed in the shape of an arc or a circle with a single radius of curvature. Side 18 should be significantly bowed out compared to a flat shape which would provide a triangle. For example, the area A distended by a dotted line L connecting the ends of side 18 is preferably at least 10 to 20% or more of the total transverse cross sectional area.

The grooves 20 act in cooperation with the curved surface to provide an attractive, rapid burn. The grooves tend to promote lineal fire progression from the point at which the exterior groove wall of the log is ignited to spread horizontally across the groove wall. In other words, if the flame contacts the groove wall in a limited horizontal area, the groove edge tends to spread the flame along the length of the groove.

The grooves also serve to break up the flames as they roll up the face of the log and texture the flames in a manner similar to a natural firelog. The flame is formed into waves to provide a more efficient burning. In addition, when conventional coloring chemicals are included in the composition, the colors of the flame tend to dance across the grooves yielding a very attractive appearance.

Referring again to the specific firelog of FIG. 1, flat side 14 and 16 are of approximately the same length in a cross section transverse to the log. If desired, one of the flat sides may be longer in transverse dimensions to a ratio of high as 4:1. Using unequal lengths, the flame characteristics of the firelog may be varied depending upon the disposition of the longer side. For example, the horizontal side is longer, a slower more instant burn is provided. On the other hand, if the vertical side is longer providing a "taller" log, the burn tends to be more rapid and more spectacular. Thus, there is a choice as to which type of burn is deemed to be desirable. In any event, flap 24 should be disposed at the bottom of the log for folding out to provide the leading edge to facilitate ignition of the log.

Any conventional composition used for a flammable firelog may be used in accordance with the present invention. One such composition is a mixture of wax and particulate material (sawdust). In addition, chemicals such as copper chloride or ammonium sulfate, are conventionally added to such compositions to provide color to the flame. One formulation includes 55-60 weight % wax, 38-44 weight % sawdust, and 1-2 weight % such other chemicals. Suitably, the wax is a soft wax generally designated "slack wax". Such waxes generally are solid at room temperature and have a cone penetration at 77° F. of between 20 and 55.

As set out above, it is preferable for the flame to burn preferentially on the curved side which faces the fireplace opening. Use of a paper-based sheath of excess circumference over that required for flush wrapping of the firelog assists in such preferential burning. By laying the firelog along flat end 16, the paper is flush against the bottom side leaving an air gap between the sheath and the other two sides, especially with respect to the curved side. This is important as the sheath burns far more rapidly when there is such an air gap so that oxygen can contact both sides of it than when the sheath is flush against the side of the log.

Preferential burning of the curved side may be further assisted by using a sheath of fire retardant paper. The conventional wrapping for Sterno-brand types of firelogs are clay coated and so serve this fire retardant purpose. If desired, a coating such as Scotch-Gard by Minnesota Mining and Manufacturing Co. could be placed over the clay coated paper to further reduce the capability of such paper to burn. This is accentuated with respect to the more flush sides. Also, in another technique, a flame retardant coating may be sprayed or brushed onto the flat sides but not onto the curved side of the firelog.

The firelog may be adapted for even more selective burning of the curved section by adhering a sheath of fire retardant properties to both flat sides of the log with a suitable adhesive leaving the portion of the sheath covering the curved surface unattached forming an air gap. The portion of the sheath adhered flush to the flat surfaces is not readily ignitable and so the curved surface preferentially burns.

Referring to FIG. 3, a rectangular carton 40 is illustrated, suitably formed of corrugated paper, for containing four pie segment shaped logs according to the invention, designated 42, 44, 46, and 48, respectively. Container 40 includes horizontal top and bottom walls 50 and 52 and vertical side walls 54 and 56. As illustrated, the shape of the pie segment shaped logs facilitates stacking of four of them in a rectangular box so long as the flat sides of each log are perpendicular to each other and the sizes of the logs are approximately the same. As illustrated, flat side 58 of log 42 is flush against the corresponding flat side 60 of log 44 at the center of the package so that the curved surfaces meet in a continuous curve at the center. Similarly, the other flat surfaces 62 and 64 of logs 42 and 44, respectively, lie flat against top wall 50 forming a surface twice the length of the individual sides. The other pair of firelogs 46 and 48 are disposed with their perpendicular intersecting side 66, 68 and 70, 72, respectively, resting adjacent opposite corners of the rectangular carton. At the center of the carton, the curved surfaces contact each other tangentially in areas designated "x" in FIG. 3. All logs include outer sheaths 73 of the type described above.

The arrangement of FIG. 3 is particularly effective in that none of the logs stand on a point, but are instead capable of reinforcing the strength of this stack package. In addition, the curved surfaces are directed inwardly so that all flat surfaces are flush with the carton. Therefore, any wrinkles which develop in the sheath due to the excess material are generally along the curved surfaces of the logs. When the logs are removed from the carton the wrinkle creates air gaps at the curved surface. As set out above, this is highly desirable in assisting preferential burning of the curved surface.

The firelog of the present invention may be formed by a conventional extrusion process as follows. The wax in molten form is thoroughly mixed with the wood chips and chemicals at above 120° F. to 130° F. for about 10 minutes. Then, the mixture is cooled to about 90° F. to 95° F. and fed to the hopper of an extruder. Then, the mixture is ground by passage through the screw-barrel of the extruder into the die barrel. The log is extruded through a die of the foregoing type. The conditions of extrusion are those utilized for a standard firelog. Thus, a Reitz RE-10 extruder may be employed using a pressure of 200 to 300 psi and with the die head illustrated in FIG. 4. Then, the extruded body is cut into firelog segments.

Referring to FIG. 4, a die head, generally designated by the number 74 is illustrated which is capable of extruding simultaneously two artificial firelogs of generally pie segment shaped cross section. The die includes a curved die wall 76 intersecting the ends of a generally flat die wall 78. A transverse die cutter blade 80 bisects wall 78 and is perpendicular to the same. It also intersects curved wall 76 to form segments 76a and 76b. Surfaces 76, 78, and 80 define firelog extrusion compartments 82 and 84, respectively. Means are provided for cutting six parallel spaced grooves in the logs to be extruded in chamber 82 and 84 of the type illustrated in FIG. 1. As illustrated, such means are in the form of elongate rectangular ridges 86 suitably mounted by bolts to the curved surfaces 76a and 76b. Alternatively, such grooves could be cut into the firelog in a subsequent operation.

The die head of FIG. 4 is illustrated for extruding two logs simultaneously. It should be understood that the die head may define only a single pie segment shaped extrusion chamber or may define four extrusion chambers for extruding four logs simultaneously employing a mirror image of the illustrated embodiment.

Referring to FIG. 5, a rectangular carton 90 is illustrated suitably of the foregoing type, for containing six pie segment shaped firelogs according to the invention, designated 92, 94, 95, 98, 100, and 102, respectively, each including an outer sheath 104 of the foregoing type. Each log includes perpendicular flat walls, designated a and b, and curved walls, designated c, in combination with the respective log numbers. Container 90 includes horizontal opposed top and bottom walls 106 and 108, and vertical sidewalls 112 and 114. The shape of the pie segment shaped logs permits ready stacking in the pack of 6 logs.

As illustrated in FIG. 5, a lower set of three of the firelogs (92, 94, 96) are aligned with one of their flat sides (92b, 94b, and 96b) adjacent to and flush against bottom side 110 of container 90. The perpendicular intersection of sides 96a and 96b of log 96 is disposed flush against the corner of sides 110, 114 of the container. The curved walls (92c, 94c, 96c) face in one direction away from that corner. The lower portion of curved sides 94c and 96c abut against the upright walls 92a and 94a, respectively, of adjacent logs, while curved side 92c abuts against the corner of walls 110, 112 of the container.

An upper set of three firelogs (98, 100, 102) are aligned with one of their flat sides (98b, 100b, 102b) adjacent to and flush with top side 108 of container 90. The upper logs are inverted with respect to the lower set of logs. The perpendicular intersection of sides 98a and 98b of log 98 is disposed flush against the corner of container sides 108, 112 opposite to the corner of sides 110, 114. Curved walls 98c, 100c, 102c face in one direction opposite to curved walls 92c, 94c and 96c. The upper portions of curved sides 98c and 100c abut against the inverted upright walls 100a and 102b, respectively, of adjacent logs, while curved side 102c abuts against the corner of container walls 108, 114. The curved surfaces of each log in the upper set rests on and is supported by the curved surfaces of a corresponding log in the lower set. If the package is inverted, this relationship is reversed.

What is claimed is:

1. An artificial composite flammable firelog of generally pie segment shaped transverse cross section formed by two generally flat elongate substantially perpendicular intersecting sides and a third elongate curved side of predominantly convex configuration.

2. The firelog of claim 1 in which said curved side includes multiple spaced generally parallel grooves along the length of said curved side.

3. The firelog of claim 1 together with a wrapper surrounding all sides of the firelog in which the wrapper is at least partially flame retardant in the portions of the wrapper adjacent to both of the flat sides.

4. The firelog of claim 3 in which said flame retardant portion comprises clay coated paper.

5. The firelog of claim 3 in which the wrapper portions adjacent the flat sides are adhered flush to such sides, and the wrapper portion and the adjacent curved side of said firelog define a substantial air gap therebetween.

6. The firelog of claim 1 in which the flat sides are directly coated with a flame retardant layer.

7. The firelog of claim 1 in which the flat sides are of unequal length transverse to the firelog.

* * * * *